United States Patent
Robert

(10) Patent No.: US 7,063,633 B2
(45) Date of Patent: Jun. 20, 2006

(54) DRIVING PULLEY FOR A CONTINUOUSLY VARIABLE TRANSMISSION

(75) Inventor: Jean Robert, Drummondville (CA)

(73) Assignee: CVTECH R&D Inc., Quebec (CA)

(*) Notice: Subject to any disclaimer, the term of this patent is extended or adjusted under 35 U.S.C. 154(b) by 217 days.

(21) Appl. No.: 10/469,558

(22) PCT Filed: Mar. 6, 2002

(86) PCT No.: PCT/CA02/00314

§ 371 (c)(1),
(2), (4) Date: Aug. 29, 2003

(87) PCT Pub. No.: WO02/070920

PCT Pub. Date: Sep. 12, 2002

(65) Prior Publication Data

US 2005/0064968 A1    Mar. 24, 2005

Related U.S. Application Data

(60) Provisional application No. 60/273,643, filed on Mar. 7, 2001.

(51) Int. Cl.
*F16H 63/04* (2006.01)
*F16H 63/18* (2006.01)

(52) U.S. Cl. ............. 474/13; 474/19; 474/21; 474/17

(58) Field of Classification Search ............ 474/12, 474/13, 15, 17, 19, 21
See application file for complete search history.

(56) References Cited

U.S. PATENT DOCUMENTS

| 2,422,196 | A | * | 6/1947 | Heyer ............... 474/12 |
|---|---|---|---|---|
| 2,496,201 | A | * | 1/1950 | Dodge ............... 474/15 |
| 2,987,934 | A | * | 6/1961 | Thomas ............. 474/12 |
| 3,395,587 | A | * | 8/1968 | Casini ............... 474/12 |
| 4,515,575 | A | * | 5/1985 | Kinbara et al. ...... 474/13 |
| 4,634,405 | A | | 1/1987 | Miranti, Jr. et al. |
| 5,172,786 | A | * | 12/1992 | Ishibashi et al. ..... 474/13 |
| 5,514,040 | A | * | 5/1996 | Robert .............. 474/13 |
| 6,086,492 | A | | 7/2000 | Nakagaki et al. |

* cited by examiner

*Primary Examiner*—Marcus Charles
(74) *Attorney, Agent, or Firm*—Timothy J. Keefer; Seyfarth Shaw LLP

(57) ABSTRACT

The driving pulley comprises two centrifugal mechanisms, namely a positive assembly and a negative assembly. Both assemblies comprise a respective set of flyweights subjected to the centrifugal force when the driving pulley rotates. The positive assembly is used as a conventional speed governor that moves one of the two flanges of the driving pulley towards the other in order to increase its winding diameter when the rotation speed increases. The negative assembly is used to apply an opposite force on the positive assembly when the rotation speed is above a threshold value so as to defer the upshift of the CVT to a higher ratio under the action of the positive assembly. This allows to maintain, for instance, a high rotation speed during an intense acceleration and a lower rotation speed when cruising at low vehicle speeds.

12 Claims, 6 Drawing Sheets

DRIVING PULLEY FOR A CONTINUOUSLY VARIABLE TRANSMISSION

CROSS REFERENCE TO RELATED APPLICATION

This application is a US National Phase of International Patent Application serial No. PCT/CA02/00314, filed Mar. 6, 2002 which claims the priority of U.S. Patent Application Ser. No. 60/273,643, filed Mar. 7, 2001.

BACKGROUND OF THE INVENTION

A continuously variable transmission (CVT) is a mechanical device in which the torque transmission ratio is infinitely variable over the working range, by contrast to a conventional transmission in which there is a limited number of selectable torque transmission ratios. A CVT automatically changes the ratio as required by load and speed conditions, providing an increased torque under high loads at low speeds and yet controlling the rotation speed of the motor as the vehicle accelerates. It is commonly used in a wide range of vehicles, such as small cars or trucks, snowmobiles, golf carts, all-terrain vehicles (ATV) and scooters. A CVT is usually coupled to a motor, such as an internal combustion engine or an electric motor.

A conventional CVT comprises a driving pulley mechanically connected to the motor, a driven pulley mechanically connected to wheels or a track, and a trapezoidal drivebelt transmitting torque between the driving pulley and the driven pulley. The sides of the drivebelt are, on each pulley, gripped between two opposite flanges that are coaxially mounted around a main shaft. One of the flanges is axially movable with reference to the other. Each flange is directly or indirectly in a torque-transmitting engagement with the corresponding main shaft.

Initially, such as when the vehicle is stopped or at low speeds, the winding diameter of the driving pulley is minimum and the winding diameter of the driven pulley is maximum. This is referred to as the minimum ratio since there is the minimum number of rotations or fraction of rotation of the driven pulley for each complete rotation of the driving pulley.

The driving pulley generally comprises a centrifugal mechanism that is provided to increase the ratio when its rotation speed increases. To do so, the centrifugal mechanism is able to apply a force on the movable flange of the driving pulley to move it closer to the fixed flange, thus urging the drivebelt to wind on a larger diameter around the driving pulley. At the same time, the shift in the position of the drivebelt towards the driving pulley urges the movable flange of the driven pulley away from the fixed flange thereof.

The driven pulley of a CVT is torque-sensitive. This allows the driven pulley to counterbalance the force generated by the centrifugal mechanism of the driving pulley so as to allow the motor speed to rise to an optimum level before the CVT starts upshifting during an acceleration. The driven pulley also allows the CVT to downshift if the load increases. Accordingly, the driven pulley comprises a cam system urging the movable flange to move towards the fixed flange of the driven pulley when the torque increases, thereby pulling back on the drivebelt and fighting the force generated by the centrifugal mechanism of the driving pulley. A conventional cam system comprises a cam plate having a plurality of symmetrically-disposed inclined cam surfaces on which respective cam followers are engaged. The cam followers are generally slider buttons or rollers. The cam plate or the set of cam followers is mounted at the back side of the fixed flange and the other of them is usually rigidly connected to the main shaft.

In use, the movable parts of the CVT constantly seek to rearranged their position until an equilibrium is reached or until they reach the maximum ratio. The ratio at which the CVT stabilizes is an equilibrium between the forces on the drivebelt applied by the driving and the driven pulley. At the maximum rotation speed, the ratio is maximum as there is the maximum number of rotations or fraction of rotation of the driven pulley for each complete rotation of the driving pulley. Then, when the rotation speed of the motor decreases, the force generated by the centrifugal mechanism decreases as well. Return springs located in the driving and in the driven pulley allow the corresponding movable flanges to move back to or near their original low ratio position.

A conventional centrifugal mechanism of a driving pulley generally comprises a set of centrifugal flyweights pushing their way through a pair of opposite inclined ramps converging towards the periphery of the driving pulley. Each of these flyweights are subjected to a centrifugal force F as in the following equation:

$$F = m r \omega^2 \sin \theta$$

where m is the mass of the flyweight, r is the radius from the center of the main shaft, $\omega$ is the rotation speed and $\theta$ is the angle of the ramps with reference to the main shaft. As one can see from the equation, the force is a function of the square of the rotation speed, which means that the centrifugal force increases more rapidly that the proportional increase in the rotation speed itself. Also, the flyweights are moved away from the center of the main shaft when the centrifugal force increases, which in turn also increases the force since the latter depends on the radius r. It follows that the centrifugal system of the driving pulley soon becomes proportionally stronger than the cam system of the driven pulley, thereby shifting the position of the drivebelt towards the driving pulley. As a result, a conventional CVT tends to upshifts too early towards the maximum ratio when the rotation speed of the driving pulley increases. This is partially kept under control by changing the angle of the ramps in function of the position of the flyweights, thus in function of the ratio. The angle of the ramps with reference to the axis of rotation is smaller at a higher ratio.

One of the drawbacks of a conventional driving pulley is thus the lack of direct control on the force generated by the centrifugal mechanism. Changing parameters such as the mass of the flyweights or the profile of the ramps to allow a higher motor speed during an acceleration is not always a suitable or possible solution due to the impacts it has on the overall behavior of the CVT. For instance, if the CVT is designed to allow a low rotation speed of the motor at a moderate cruising speed to reduce fuel consumption and noise, then during an intense acceleration, the rotation speed of the motor will most probably be too low. Conversely, if the CVT is designed for allowing a high rotation speed of the motor during an intense acceleration to obtain a maximum power therefrom, then the rotation speed is likely to be too high at moderate cruising speed.

SUMMARY OF THE INVENTION

The present invention allows providing additional control over the transmission shift pattern of a CVT so as to reduce the force generated by the centrifugal system of the driving pulley when certain conditions are met. Accordingly, the position of the driving pulley is normally controlled in a conventional way by a first set of flyweights, which are part of an assembly referred to as the "positive assembly". Then, beginning from a predetermined rotation speed, a second set of flyweights, which are part of an assembly referred to as the "negative assembly", will start coming into action. The basic purpose of the negative assembly is to generate an axial force that is opposite the one generated by the positive assembly on the second flange. However, that opposite force is not substantially active unless there is an engagement between the negative assembly and the positive assembly. The mass of the flyweights, the angles of the ramps, the presence and length of stoppers, the rates and preload of the springs as well as all other parameters are taken in account in the design so that the engagement between the negative and the positive assemblies is only happening if proper conditions are met.

More particularly, the present invention provides a driving pulley for a continuously variable transmission, the driving pulley being coaxially mountable around a main shaft and rotatable at a variable rotation speed, the driving pulley comprising:

a first flange having opposite first and second sides, the first side being provided with a conical wall;
a second flange coaxial with the first flange and having a conical wall facing the conical wall of the first flange to form a drivebelt-receiving groove around which a drivebelt is wound, the second flange being axially movable with reference to the first flange;
first means for connecting the first flange to the main shaft in a torque-transmitting engagement;
second means for connecting the second flange to the main shaft in a torque-transmitting engagement;
a positive assembly comprising:
  a positive carriage coaxial with the first flange and rigidly connected to the second flange;
  third means for connecting the positive carriage to the main shaft in a torque-transmitting engagement;
  at least two symmetrically-disposed pairs of radially-converging and mutually-opposite first ramps, each pair having one ramp connected to the positive carriage and another ramp connected to the second side of the first flange; and
  radially-movable flyweights, each set between a corresponding pair of first ramps;
fourth means for generating a return force urging the second flange to move away from the first flange;
a negative assembly comprising:
  a negative carriage coaxial and axially movable with reference to the first flange, the negative carriage being configured and disposed to be in engagement with the positive carriage;
  fifth means for connecting the negative carriage to the main shaft in a torque-transmitting engagement;
  at least two symmetrically-disposed pairs of radially-converging and mutually-opposite second ramps, each pair having one ramp connected to the negative carriage and another ramp connected to an end plate fixed with reference to the first flange;
  sixth means for connecting the end plate to the main shaft in a torque-transmitting engagement; and
  radially-movable flyweights, each set between a corresponding pair of second ramps; and
seventh means for generating a return force urging the negative carriage away from the first flange.

BRIEF DESCRIPTION OF THE DRAWINGS

A non-restrictive description of a preferred embodiment will now be given with reference to the appended figures, in which.

DESCRIPTION OF THE PREFERRED EMBODIMENT(S)

Figure 1:
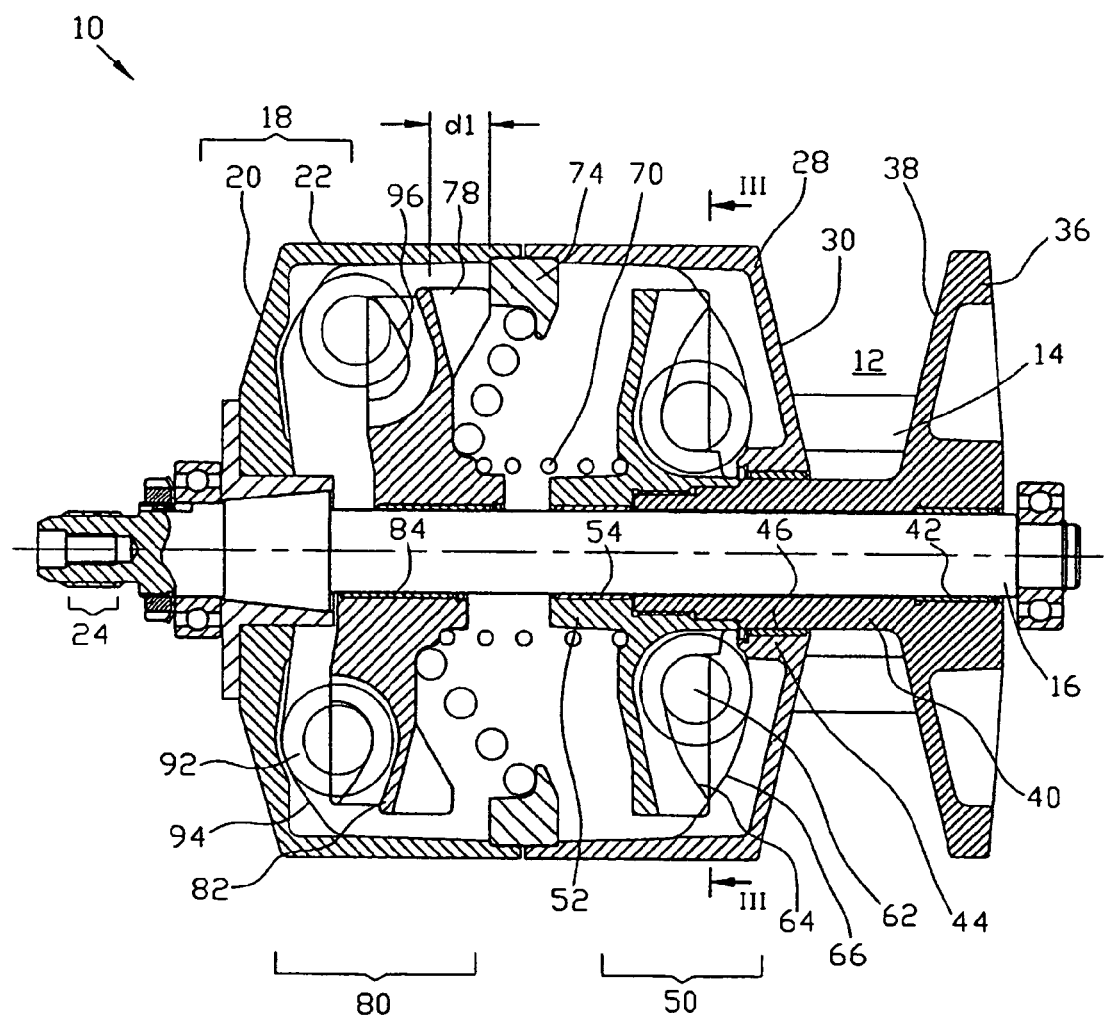
FIG. 1 is a longitudinal cross-sectional view of a driving pulley according to a preferred embodiment of the present invention, showing two possible positions of the negative assembly when the driving pulley is at a low ratio position.

The following is a list of the reference numerals, along with the names of the corresponding components, that are used in the appended figures and in the description.

10 driving pulley
12 belt-receiving groove
14 trapezoidal drivebelt
16 main shaft
18 hollow drum
20 end member (of the drum)
22 cylindrical body (of the drum)
24 connector
28 first flange
30 conical wall (of the first flange)
36 second flange
38 conical wall (of the second flange)
40 sleeve (for the second flange)
42 bushings (for the second flange)
44 opening (in the first flange)
46 bushing (in the opening of the first flange)
50 positive assembly
52 positive carriage
54 bushings (of the positive carriage)
56 cam followers (of the positive assembly)
58 spindles (of the positive assembly)
60 slots (in the drum)
62 flyweights (of the positive assembly)
64 first ramps (of the positive assembly)
66 second ramps (of the positive assembly)
70 spring (of the positive assembly)
72 spring (of the negative assembly)
74 intermediary part (of the cylindrical body)
78 stoppers
80 negative assembly
82 negative carriage
84 bushings (of the negative carriage)
86 cam followers (of the negative assembly)
88 spindles (of the negative assembly)
90 slots (in the drum)
92 flyweights (of the negative assembly)

94 first ramps (of the negative assembly)
96 second ramps (of the negative assembly)

The driving pulley (10) is primarily designed to be used in a continuously variable transmission (CVT) of a vehicle, such as a small car or truck, a snowmobile, a golf cart, an all-terrain vehicle (ATV) or a scooter. However, it is possible to find other applications or other environments where the driving pulley (10) may be advantageously used, such as in fixed commercial or industrial machines.

FIGS. 1 to 5 show a driving pulley (10) according to a possible and preferred embodiment of the present invention. It should be noted that the parts shown in FIGS. 2 to 5 and which are not referred to, correspond to the same components than those shown in FIG. 1. Other embodiments could also be devised within the scope of the present invention.

The driving pulley (10) is coaxially mounted around a main shaft (16) that is to be mechanically coupled to the output shaft of a motor (not shown), for instance an internal combustion engine of a motor vehicle. The main shaft (16) can be provided as a part of driving pulley (10) or be an extension of an existing shaft around which the driving pulley (10) is mounted. The advantage of having a main shaft (16) as a part of the driving pulley (10) is that the latter can be pre-mounted and directly installed in the vehicle.

It should be noted that the term "coaxial" used in the description and the claims only means that the corresponding elements have a common medial axis and does not mean that the elements have necessarily a circular cross section. Also, because the driving pulley (10) is to be driven into high rotation speeds, all parts are balanced with reference to the main shaft (16), as apparent to a person skilled in the art.

The driving pulley (10) comprises a first flange (28) and a second flange (36), both facing each other and having opposite conical walls (30,38) defining between them a drivebelt-receiving groove (12). A trapezoidal drivebelt (14) is wound in an arc around a large portion of the conical walls (30,38). About half the torque transmitted by the drivebelt (14) goes through the first flange (28) while the other half goes through the second flange (36).

The first flange (28) is preferably supported by means of a hollow drum (18). The drum (18) comprises a radially-extending end member (20) and a cylindrical body (22). The cylindrical body (22) is attached to the periphery of the end member (20). The end member (20) is in a torque-transmitting engagement with the main shaft (16). To do so, the end member (20) can be rigidly connected to the main shaft (16) by an appropriate means, such as a spline or cone which is press fitted in a corresponding counter part. It can also be connected by fasteners, welding, press fitting, etc.

Figure 2:
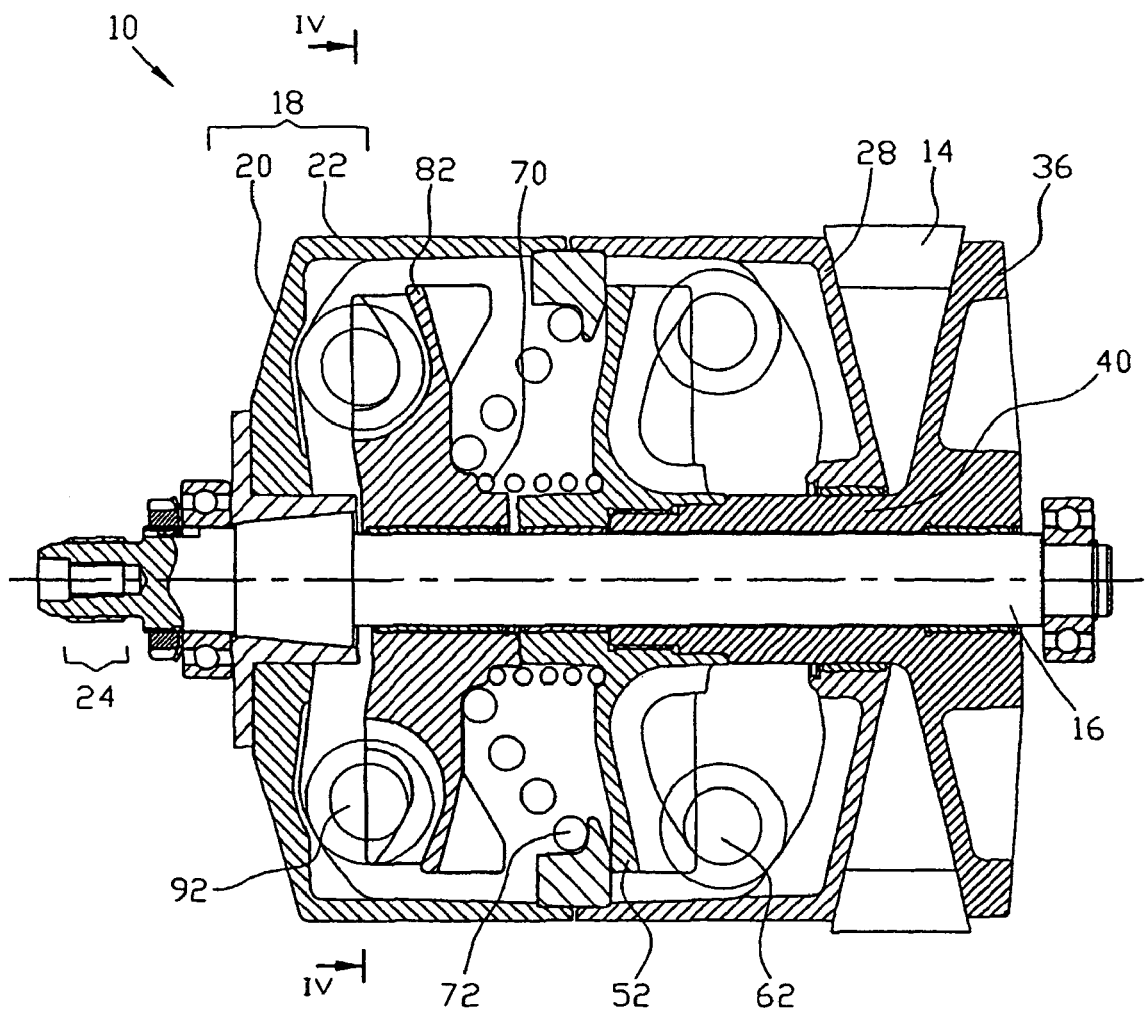
FIG. 2 is a longitudinal cross-sectional view similar to FIG. 1, showing two possible positions of the negative assembly when the driving pulley is at a high ratio position.

The drum (18) forms a housing enclosing and protecting most other parts of the driving pulley (10). It should be noted at this point that it is possible to construct the drum (18) differently than what is shown in FIGS. 1 and 2. For instance, the end member (20) and the cylindrical body (22) may be divided in space-apart strips (not shown) or be in the form of a rigid mesh (not shown).

The second flange (36) is preferably supported around the main shaft (16) by means of an elongated sleeve (40). The sleeve (40) is coaxially mounted around the main shaft (16) and is free to slide with reference to the main shaft (16). Bushings (42) are used to separate the sleeve (40) from the main shaft (16) and facilitate the sliding movement. The sleeve (40) extends through a central opening (44) provided in the middle of the first flange (28). The opening (44) encloses a bushing (46) and the outer surface of the sleeve (40) is in a sliding engagement with the interior surface of the bushing (46). The bushings (42) can also be replaced by a linear bearing (not shown) or the like.

FIGS. 1 and 2 further show a positive assembly (50) which governs the relative distance between the first flange (28) and the second flange (36) in function of the rotation speed of the driving pulley (10). The distance between the flanges (28, 36) is also a function of the resulting axial force created by the drivebelt (14) on their conical walls (30, 38). The positive assembly (50) comprises a positive assembly carriage (52) coaxially and slidably mounted around the main shaft (16), preferably by means of bushings (54). The positive assembly carriage (52) is preferably rigidly connected to the sleeve (40) and supported by it.

Figure 3:
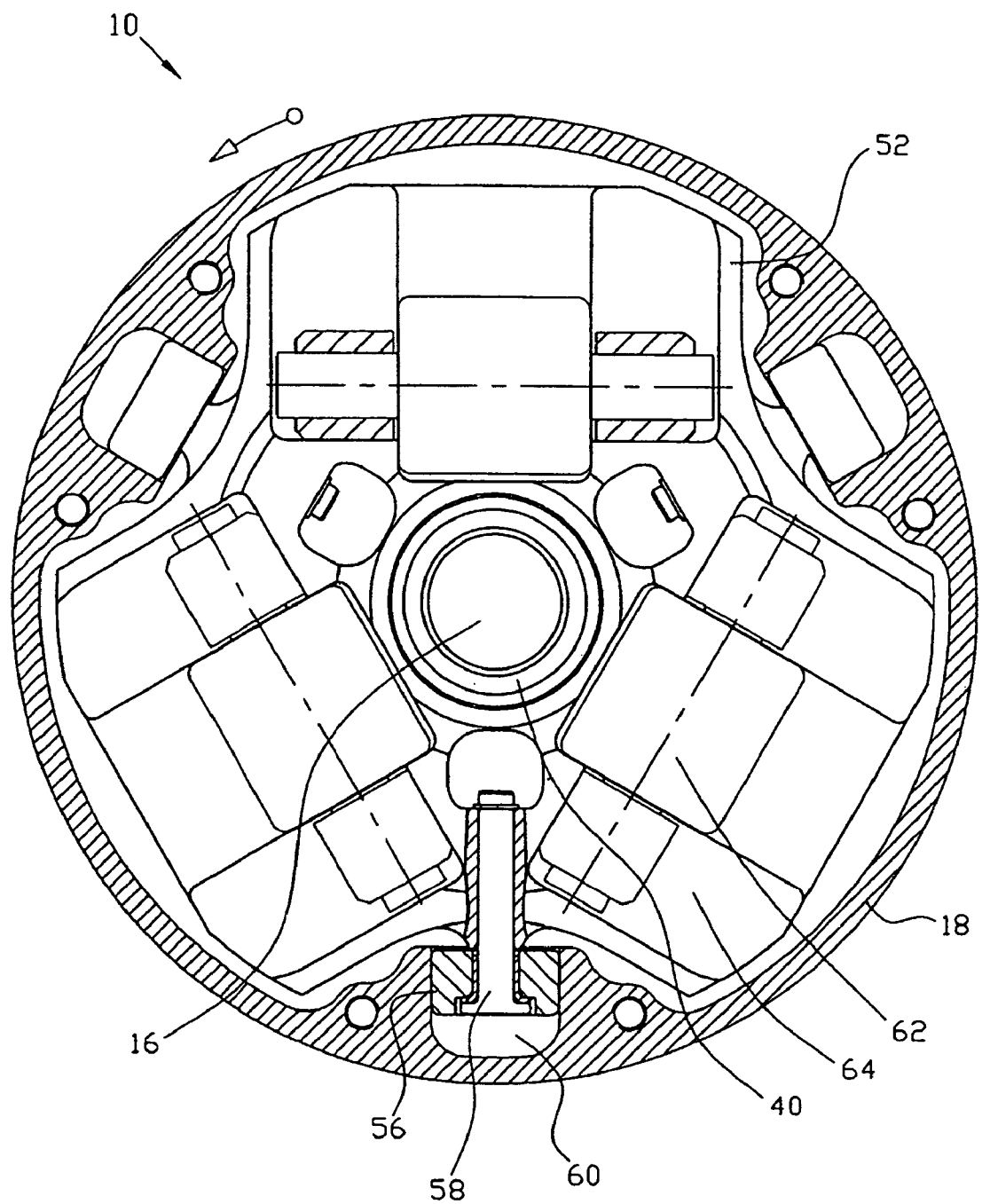
FIG. 3 is a radial cross-sectional view taken along line III—III in FIG. 1.

As best shown in FIG. 3, the positive assembly carriage (52) is operatively connected to the drum (18) by means of a plurality of cam followers (56), which are symmetrically disposed with reference to the main shaft (16). The cam followers (56) are preferably rollers and three in number. Alternatively, the cam followers (56) can be slider buttons (not shown). Each roller (56) is preferably mounted around a bushing or a bearing. Each roller (56) is coaxially located around a respective radially-extending spindle (58) and is guided by a longitudinally-extending slot (60) located in the drum (18). The slots (60) have a width slightly larger than the outer diameter of the rollers (56). The rollers (56) are then freely longitudinally movable inside the corresponding slot (60) and the length of the slots (60) substantially corresponds to the displacement of the second flange (36).

In use, the portion of the torque from the motor transmitted by the second flange (36) goes through the main shaft (16), the drum (18), the positive assembly carriage (52) by means of the rollers (56) and their slots (60), the sleeve (40) and then finally reaches the second flange (36). The torque can also be transmitted in the other direction, for example during a deceleration. Alternatively, it is possible to devise other ways of achieving the transmission of the torque, one being the use of a linear bearing (not shown) between the sleeve (40) and the main shaft (16).

As shown in FIGS. 1 and 2, the positive assembly (50) comprises a plurality of flyweights (62) symmetrically disposed with reference to the main shaft (16). There are preferably three flyweights (62). Each flyweight (62) is located between a corresponding pair of flyweight ramps (64, 66). The number of flyweights (62) is equal to the number of pairs of flyweight ramps (64, 66). Both ramps (64, 66) of each pair are radially converging with reference to the main shaft (16). In the illustrated embodiment, the first ramps (64) are provided on the positive assembly carriage (52) and the second ramps (66) are integral with the backside of the first flange (28).

Figure 4:
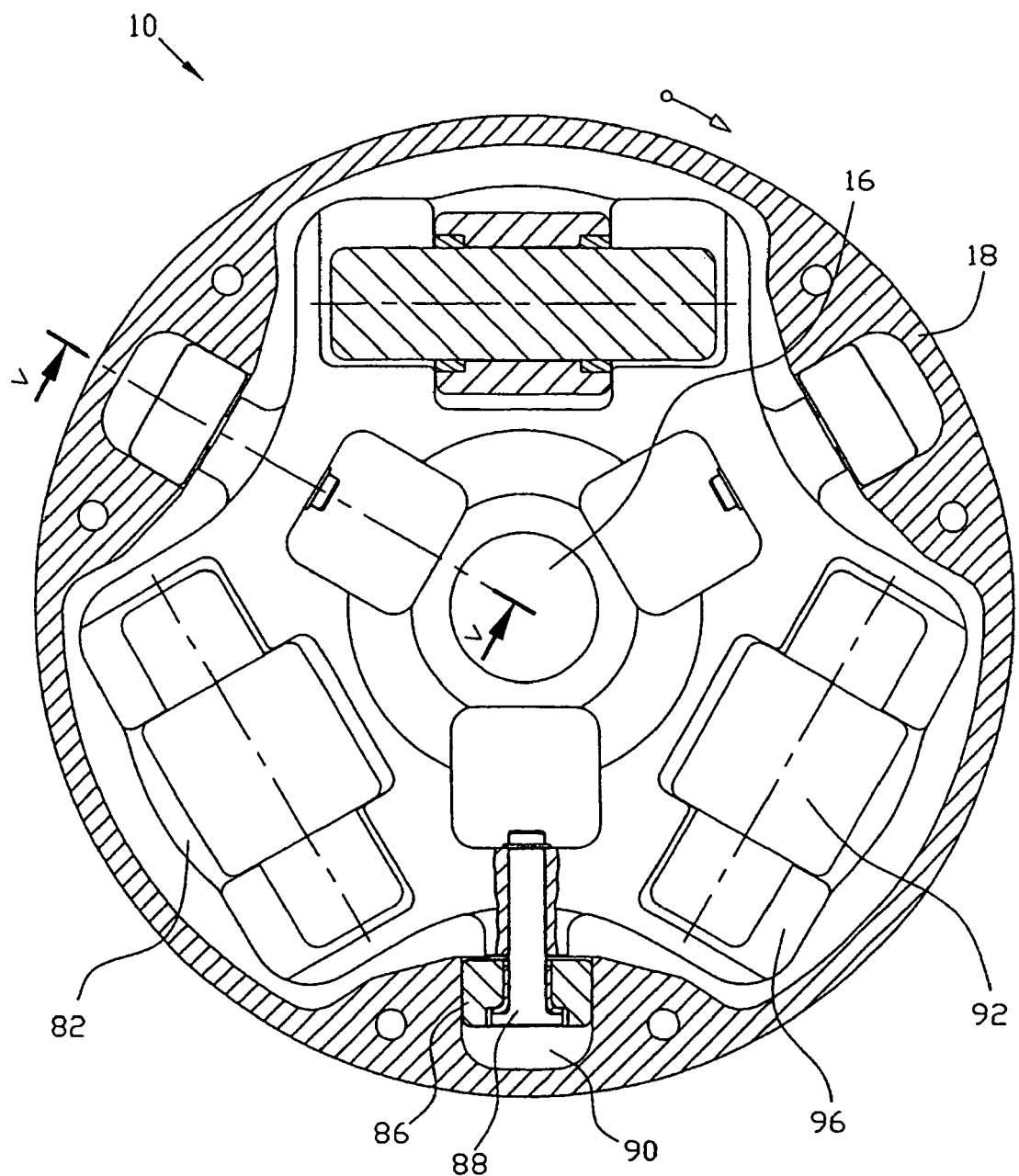
FIG. 4 is a longitudinal cross-sectional view taken along line IV—IV in FIG. 2.

As shown in FIG. 4, each flyweight (62) is preferably constructed in three parts, namely a central cylindrical part and two identical cylindrical side parts. The central part does not have the same diameter that the two side parts. A bushing or bearing (not shown) allows a distinct rotation of the central part with reference to the two side parts. One of the ramps (64, 66) is provided in two sections, each being in engagement with respective side parts, and the other of the ramps (64,66) is in engagement with the central part. The angle of the ramps (64, 66) with reference to a longitudinal axis of the driving pulley preferably decreases towards the exterior. A damper material, for instance a plastic composite that avoids deformation of the ramps, may further cover the parts of the flyweights. It should be noted that the positive flyweights (62) may be constructed differently. For instance, they may be designed to slide on the ramps (64, 66) instead of rolling thereon.

Figure 5:
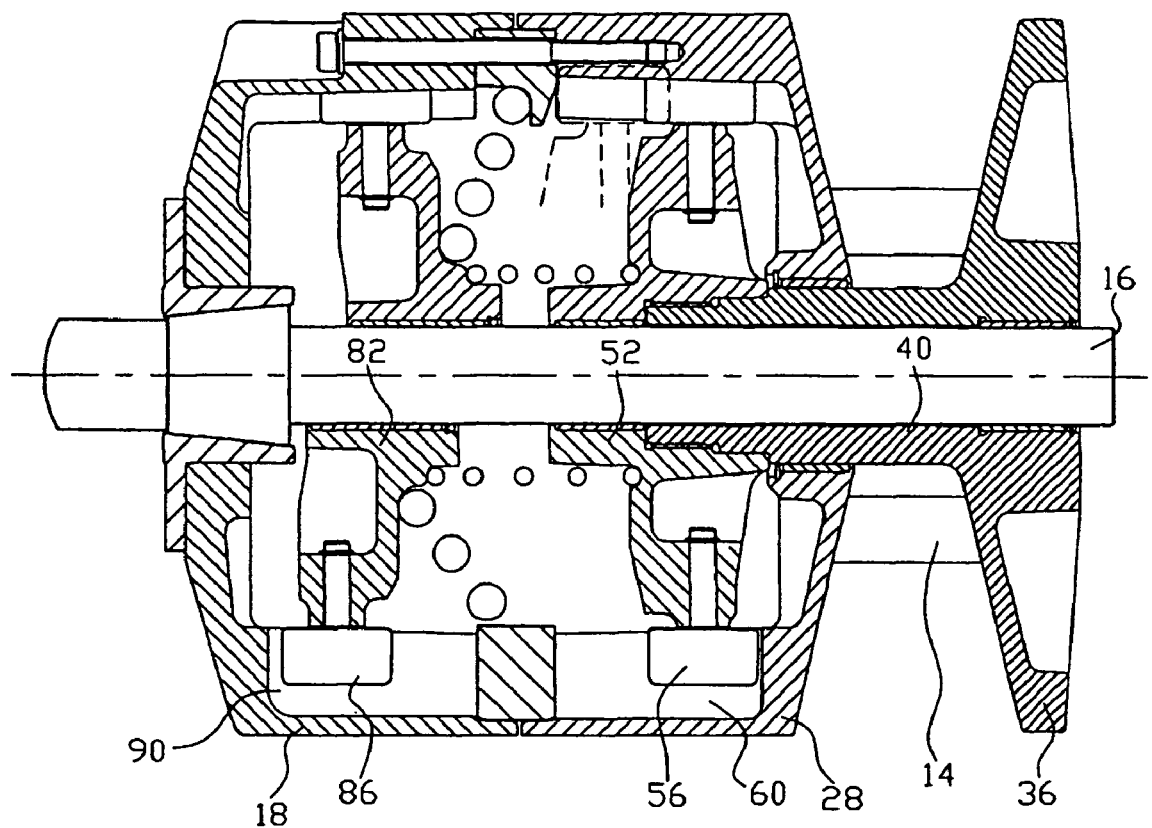
FIG. 5 is a radial longitudinal cross-sectional view taken along line V—V in FIG. 4.

The flyweights (62) are radially movable between their respective pair of ramps (64, 66). They are forced radially outwards by the centrifugal effect of the flyweights (62) as they act on the ramps (64, 66), creating a first force biasing the second flange (36) towards the first flange (28) in function of the rotation speed of the driving pulley (10). The first force tends to increases the winding diameter of the drivebelt-receiving groove (12), thus the ratio of the CVT. The axial reaction of the flyweights (62) is counterbalanced by the force exerted by a first spring, which is preferably a helical spring (70) coaxially mounted around the main shaft (16) and pre-loaded in compression. In FIGS. 1, 2 and 5, the spring (70) is set between the positive assembly carriage (52) and a negative assembly (80), as explained later. The first spring (70) can also be a conical spring (not shown) located between the positive carriage (52) and a fixed location, such as the intermediary part (74). Other arrangements are also possible, as apparent to a person skilled in the art.

In use, at a stable speed, an equilibrium is reached between the forces tending to close the driving pulley (10), coming from the flyweights (62) of the positive assembly (50), and the forces tending to open the driving pulley (10), coming from the first spring (70) and the axial reaction of the drivebelt (14) of the flanges (28,36) of the driving pulley (10).

The present invention is characterized in that the driving pulley (10) further comprises a negative assembly (80). The purpose of the negative assembly (80) is to generate a second force which is opposite the first force generated by the positive assembly (50). The second force will in fact increase the rotation speed at which the ratio changes compared to a similar driving pulley (10) without a negative assembly (80). The second force is mainly effective against the first force during an acceleration. However, depending on the design, its effect can be useful in other situations.

The construction of the negative assembly (80) is similar to that of the positive assembly (50). The negative assembly (80) comprises a negative carriage (82) that is slidably mounted around the main shaft (16), preferably by means of bushings (84) or a linear bearing (not shown). The negative assembly (80) also comprises a plurality of pairs of flyweight ramps (94, 96) symmetrically disposed with reference to the main shaft (16). Both ramps (94, 96) of a pair are radially converging with reference to the main shaft (16). The first ramps (94) are provided on the end plate (20) and the second ramps (96) are provided on the negative carriage (82). A flyweight (92), preferably constructed like the flyweights (62) of the positive assembly (50), is disposed between each pair of flyweight ramps (94, 96). Each flyweight (92) of the negative assembly (80) is substantially radially movable between a respective pair of ramps (94, 96).

In use, the flyweights (92) are forced radially outwards by the centrifugal effect and act on the ramps (94, 96), causing an axial reaction that tends to move the negative carriage (82) towards the positive carriage (52). A second spring (72), preferably a conical spring highly preloaded in compression, is provided to bias the negative carriage (82) away from the backside of first flange (28). One side of the second spring (72) abuts on an annular part (74) rigidly connected inside the cylindrical body (22) of the drum (18). The negative carriage (80) will then only start to move from its original position if the axial reaction force, coming from the flyweights (92) under the effect of the centrifugal force, is higher than the initial preload force of the second spring (72). This happens at a given rotation speed of the driving pulley (10). In the illustrated embodiment, the first spring (70) also applies a force which is against the axial reaction generated by the flyweights (92).

Like the positive carriage (52), and as best shown in FIGS. 4 and 5, the negative carriage (82) is operatively connected to the drum (18) by means of a plurality of cam followers (86) symmetrically disposed with reference to the main shaft (16). The cam followers (86) are preferably three rollers or, alternatively, slider buttons (not shown). Each roller (86) is preferably bushing or bearing mounted around a respective spindle (88) and is guided by a longitudinally-extending slot (90) located in the drum (18). The rollers (86) are freely longitudinally movable inside their respective slot (90) and the length of the slots (90) substantially corresponds to the displacement of the negative carriage (82). The rollers (86) and the slots (90) allow the negative carriage (82) to follow the movement of the drum (18). It should be noted that the number of rollers (86) can be less, especially since there is no driving torque going through them. It should also be noted that the rollers (86) or any other kind of cam followers can be replaced by a linear bearing (not shown) set between the negative carriage (82) and the main shaft (16).

The behavior of the driving pulley (10) is not totally dependant on the rotation speed. In fact, the preferred embodiment indirectly uses the driven pulley of the CVT to control the special features of the driving pulley (10). As aforesaid, a conventional driven pulley is a torque-sensitive mechanical device. If the load increases, such as when the torque from the motor increases, the distance between the flanges of the driven pulley will tend to decrease in order to downshift the CVT. The downshift happens if the axial reaction of the drivebelt (14) on the flanges of the driven pulley is stronger than that of the flyweights (62) of the positive assembly (50). If this is the case, the driven pulley will offset the drivebelt (14) when the ratio is above the minimum ratio, thus forcing the distance between the flanges (28,36) of the driving pulley (10) to increase. If the CVT is already at the minimum ratio, then the drivebelt (14) will not be offset but the tension therein will be very high.

The negative assembly (80) is designed to get a more efficient response from the CVT. This is due to the fact that the negative carriage (82) of the negative assembly (80) is movable within a range of positions which overlaps the range of positions of the positive carriage (52). When the rotation speed of the driving pulley (10) is above the threshold value dictated by the preload of the second spring (72), and optionally by the preload in the first spring (70) that depends on the relative position between the positive carriage (52) and the negative carriage (82), the negative carriage (82) moves closer to the positive carriage (52). There is an engagement between the positive carriage (52) and the negative carriage (82) if the rotation speed of the driving pulley (10) is high enough, depending on the ratio. If the ratio is low, the rotation speed has to be quite high for an engagement. However, if the ratio is high, the positive carriage (52) is already close to the negative assembly (82). During an engagement, the axial reaction of the flyweights (62) of the positive carriage (52) is reduced by the axial reaction of the flyweights (92) of the negative assembly (80), minus the force of the second spring (72) which increases as it is further compressed. Of course, the threshold rotation speed at which the negative carriage (82) starts to move is below the rotation speed at which the positive assembly (50) would normally start upshifting the CVT.

Figure 6:
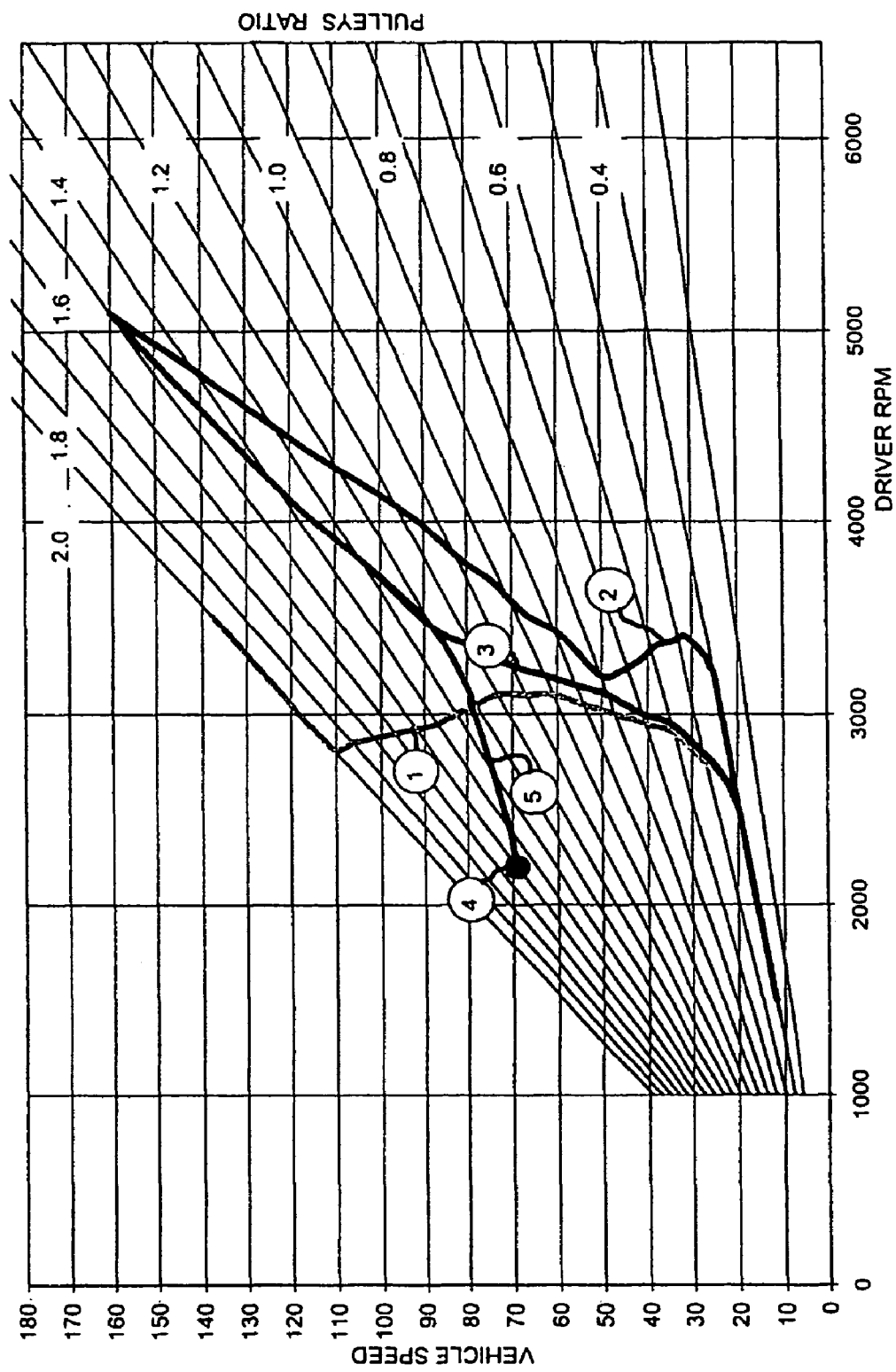
FIG. 6 is a graph showing three typical experimental curves (1,2,3) of the rotation speed of the driving pulley in function of the speed of the vehicle during a sustained and intense acceleration from a low speed and a typical curve (5) for a sustained and intense acceleration from a moderate speed (4).

The following is an example a vehicle having the mechanical characteristics of a typical automotive application and which was used to conduct experiments on a driving pulley incorporating the present invention. The some of the results of these experiments are shown in FIG. 6 to better illustrate the advantages of the present invention.

EXAMPLE

Motor: 55 HP @ 5000 rpm.
Max. design speed of the vehicle: 160 km/h
Driving pulley outside diameter: 164 mm
Center distance between driving and driven pulleys: 170 mm
Belt pitch length: 710 mm
Minimum ratio (underdrive): 0.4
Maximum ratio (overdrive): 2.0
Flyweights (positive assembly): 3 × 320 gr.
Flyweights (negative assembly): 3 × 175 gr.

Ramp angles (with respect to the longitudinal axis of the main shaft):

| Ratio: | 0.4 | 1.0 | 2.0 |
|---|---|---|---|
| Ramps (positive assembly) | 80° | 60° | 55° |
| Ramps (negative assembly) | — | 55° | 70° |

Spring:

| | Preload | Rate |
|---|---|---|
| First spring (70) | 35 kg | 10 kg/cm |
| Second spring (72) | 135 kg | 30 kg/cm |

In a conventional driving pulley, a sustained increase of the torque from the motor eventually increases its rotation speed, thus increases the rotation speed of the driving pulley (10) as well as the axial reaction from the flyweights (62) of the positive assembly (50). As aforesaid, a conventional centrifugal system soon becomes proportionally stronger than the cam system of the driven pulley and usually upshifts the ratio too early towards the maximum ratio. This is clearly visible from the experimental curve 1 in FIG. 6, where the driving pulley did not have a negative assembly (80). In that example, the transition occured near 2500 RPM and at a vehicle speed of about 20 km/h. Within a few seconds, the upshift of the ratio increased the load on the motor and held the rotation speed of the driving pulley (10) at around 3000 RPM. The vehicle continued to accelerate but the ratio of the CVT changed proportionally until it reached the maximum ratio at 110 km/h. The CVT then became a one-speed transmission up to the maximum speed of slightly under 140 km/h.

The experimental curve 2 in FIG. 6 shows an example of the relationship between the vehicle speed and the rotation speed of the driving pulley (10) that is provided with a negative assembly (80) according to the present invention. In this case, the rotation speed increased to about 3250 RPM before the ratio of the CVT changed. The effect of the negative carriage (82) in the example begins at the minimum ratio. Because it decreases the effect of the positive carriage (52), it tends to create an overshoot RPM. Then, at a ratio of about 0.8, the relationship between the vehicle speed and the rotation speed of the driving pulley (10) became substantially linear. The change in the curve mainly occurred because the angles in the sets of ramps decrease towards the periphery of the driving pulley (10). The engagement between the positive carriage (52) and the negative carriage (82) continued all the way to the maximum vehicle speed of 160 km/h. This maximum speed was over 20 km/h higher than in the previous example because an internal combustion engine motor is allowed to deliver more power at a higher rotation speed. The motor in the experiment was allowed to reach such high rotation speeds since the ratio was lower than in the example illustrated by curve 1. For instance, at 110 km/h, the ratio reached 2.0 in curve 1 while it was 1.2 in curve 2. At the maximum speed in curve 1, which is about 137 km/h, the rotation speed was about 3500 RPM, a rotation speed at which the motor could not generate enough power under the given conditions to reach a higher speed. In curve 2, at 137 km/h, the rotation speed of the motor was about 4750 RPM. The increased power coming out of the motor allowed the vehicle to reach the speed of 160 km/h and the motor to reach a rotation speed of over 5000 RPM.

In the experimental curve 3 in FIG. 6, the driving pulley (10) included a negative assembly (80) in which the range of positions of the negative carriage (82) was limited by a set of stoppers (78), which are shown in FIG. 1. The stoppers (78) were mounted on the negative carriage (82) and abutted on the intermediary part (74). Normally, and depending on the design, the outer portion of the negative carriage (82) can be used to limit the range of positions when it abuts on the intermediary part (74) or any other part fixed to the drum (18). The stoppers (78) reduced the movement of the negative carriage (82) by a distance d1. This allowed to moderate the initial effect of the negative assembly (80) (reducing the overshoot effect) and to allow the CVT to upshift from a lower rotation speed, thereby keeping a low rotation speed of the motor at relatively low vehicle speeds. The increase of the ratio moved the positive carriage (52) towards the negative carriage (82). The negative assembly (80) became effective for the rest of the acceleration as soon as there was an engagement between the positive carriage (52) and the negative carriage (82). Once an acceleration is over and the speed of the vehicle is stable, the CVT finds a new equilibrium and the rotation speed of the motor tends to decrease due to the change in the torque applied to the driven pulley.

The reference numeral 4 in FIG. 6 refers to the point in the graph when the vehicle speed was stable at 70 km/h. At that point, the ratio is 1.5 and the rotation speed of the driving pulley (10) is about 2200 RPM. Then, during a sustained and intense acceleration from that vehicle speed, the relationship between the vehicle speed and the rotation speed of the driving pulley (10) followed the experimental curve 5. Initially, the rotation speed proportionally rose faster than the increase of the vehicle speed. This is due to the fact that the CVT downshifted to about 1.2 within a few seconds. The downshifts occurred because the higher torque on the driven pulley urged the ratio to decrease. As it did, the rotation speed of the motor was allowed to increase. The increase of the rotation speed allowed the negative carriage (82) to be moved towards the positive carriage (52) and eventually reach it to help the downshift. The second part of this acceleration was identical to that of the experimental curve 3.

It should be mentioned that in the example, the driving pulley (10) is directly connected to the output shaft of the motor, as it is the case in many applications. Alternatively, it is possible to provide a gear box or another similar arrangement between the output shaft of the motor and the driving pulley (10). Yet, the presence of the first spring (70) between the positive carriage (52) and the negative carriage (82) allows the negative assembly (80) to have an indirect effect on the positive assembly (50), even when both are not in engagement.

Depending on the design and the conditions, an engagement between the positive carriage (52) and the negative carriage (82) may not happen if the vehicle accelerate at a slow rate. For instance, if only a small torque is applied on the driven pulley, the positive assembly (50) is almost free to move as soon as the rotation speed changes. The rotation speed could be kept lower than the threshold value where the negative assembly (80) comes into action.

The present invention is not limited to the described embodiments and encompasses any alternative embodiments within the limits defined by the claims.

What is claimed is:

1. A driving pulley for a continuously variable transmission, the driving pulley being coaxially mountable around a main shaft and rotatable at a variable rotation speed, the driving pulley comprising:
   a first flange having opposite first and second sides, the first side being provided with a conical wall;
   a second flange coaxial with the first flange and having a conical wall facing the conical wall of the first flange to form a drivebelt-receiving groove around which a drivebelt is wound, the second flange being axially movable with reference to the first flange;
   first means for connecting the first flange to the main shaft in a torque-transmitting engagement;
   second means for connecting the second flange to the main shaft in a torque-transmitting engagement;
   a positive assembly comprising:
      a positive carriage coaxial with the first flange and rigidly connected to the second flange;
      third means for connecting the positive carriage to the main shaft in a torque-transmitting engagement;
      at least two symmetrically-disposed pairs of radially-converging and mutually-opposite first ramps, each pair having one ramp connected to the positive carriage and another ramp connected to the second side of the first flange; and
      radially-movable flyweights, each set between a corresponding pair of first ramps;
   fourth means for generating a return force urging the second flange to move away from the first flange;
   a negative assembly comprising:
      a negative carriage coaxial and axially movable with reference to the first flange, the negative carriage being configured and disposed to be in engagement with the positive carriage;
      fifth means for connecting the negative carriage to the main shaft in a torque-transmitting engagement;
      at least two symmetrically-disposed pairs of radially-converging and mutually-opposite second ramps, each pair having one ramp connected to the negative carriage and another ramp connected to an end plate fixed with reference to the first flange;
      sixth means for connecting the end plate to the main shaft in a torque-transmitting engagement; and
      radially-movable flyweights, each set between a corresponding pair of second ramps; and
   seventh means for generating a return force urging the negative carriage away from the first flange.

2. A driving pulley according to claim 1, wherein the first means comprise a hollow drum coaxially disposed around the main shaft, the drum having one end rigidly connectable to the main shaft and a second end rigidly connected to the second side of the first flange.

3. A driving pulley according to claim 2, wherein the third means comprise a plurality of pairs of radially-projecting cam followers and corresponding axially-extending slots, each pair having one among the cam follower and the slot located on the positive carriage and having the other located on the drum.

4. A driving pulley according to claim 3, wherein the cam followers are rollers.

5. A driving pulley according to claim 1, wherein the second means comprise an axially slidable sleeve coaxially mounted around the main shaft, the sleeve rigidly connecting together the second flange and the positive carriage.

6. A driving pulley according to claim 1, wherein the fourth means comprise a spring mounted between the positive carriage and the negative carriage.

7. A driving pulley according to claim 1, wherein the fifth means comprise a plurality of pairs of radially-projecting cam followers and corresponding axially-extending slots, each pair having one among the cam follower and the slot located on the negative carriage and having the other located on the drum.

8. A driving pulley according to claim 7, wherein the cam followers are rollers.

9. A driving pulley according to claim 2, wherein the end plate is a portion of the drum.

10. A driving pulley according to claim 9, wherein the seventh means comprise a spring having one end connected to the drum and other end connected to the negative assembly.

11. A driving pulley according to claim 1, further comprising means for limiting the movement of the negative carriage with reference to the positive carriage.

12. A driving pulley according to claim 11, wherein the means for limiting the movement of the negative carriage comprise at least one stopper set between an upper part of the negative carriage and a location fixed with reference to the first flange.

* * * * *